United States Patent [19]

Golan

[11] Patent Number: 5,336,031

[45] Date of Patent: Aug. 9, 1994

[54] CAR PARKING SYSTEM

[76] Inventor: Zeev Golan, 9 Yair Stern Street, Herzlia, Israel

[21] Appl. No.: 3,563

[22] Filed: Jan. 13, 1993

Related U.S. Application Data

[63] Continuation-in-part of Ser. No. 672,036, Mar. 19, 1991, abandoned.

[30] Foreign Application Priority Data

Mar. 25, 1990 [IL] Israel ........................ 93875

[51] Int. Cl.⁵ .............................................. E04H 6/06
[52] U.S. Cl. ...................................... 414/229; 254/88
[58] Field of Search ................................ 414/228-230; 254/88, 90, 91

[56] References Cited

U.S. PATENT DOCUMENTS

| | | | |
|---|---|---|---|
| 1,890,796 | 12/1932 | Stearns | 414/229 |
| 1,987,376 | 1/1935 | Stearns | 414/230 |
| 3,628,209 | 12/1971 | Parent | 414/228 X |
| 3,786,940 | 1/1974 | Klaus | 414/229 |
| 3,941,257 | 3/1976 | Matsuura | 414/229 X |
| 4,088,303 | 5/1978 | Aquila | 254/88 |
| 4,090,621 | 5/1978 | Parent | 414/230 |
| 4,486,140 | 12/1984 | Klaus | 414/229 |
| 5,207,333 | 5/1993 | Peng | 414/228 X |

FOREIGN PATENT DOCUMENTS

| | | | |
|---|---|---|---|
| 1434741 | 10/1968 | Fed. Rep. of Germany | 414/229 |
| 1434843 | 3/1969 | Fed. Rep. of Germany | 414/229 |
| 2008915 | 11/1971 | Fed. Rep. of Germany | 414/229 |
| 2225295 | 10/1973 | Fed. Rep. of Germany | |
| 2237593 | 2/1974 | Fed. Rep. of Germany | 414/229 |
| 56143 | 12/1978 | Israel | |
| 676484 | 11/1964 | Italy | 414/229 |
| 52-18673 | 2/1977 | Japan | 414/229 |
| 192963 | 8/1989 | Japan | 414/228 |
| 1-226988 | 9/1989 | Japan | 414/228 |
| 1157843 | 7/1969 | United Kingdom | 414/229 |
| 2084541 | 4/1982 | United Kingdom | 254/90 |

*Primary Examiner*—David A. Bucci
*Attorney, Agent, or Firm*—Pollock, Vande Sande & Priddy

[57] ABSTRACT

A parking system for vehicles includes a vehicle support platform adapted to support a vehicle over a parking area and having a rear end portion permitting travel of a vehicle thereacross, a front end portion, and side portions extending longitudinally between the rear and front end portions; and support apparatus for the platform located at a predetermined end portion of the parking area and adapted to engage the platform front end portion only. The support apparatus also includes lifting apparatus which is operative to cause an initial pivoting of the platform about the rear end portion such that the front end portion of the platform becomes elevated above the rear end portion, and which is also operative to cause an additional pivoting of the platform about the front end portion to elevate the rear end portion of the platform relative to the front end portion, thereby bringing the platform into a raised position and provide vertical clearance between the platform and the parking area that is sufficient to enable entry of a vehicle beneath the platform. The support apparatus supports the platform in the raised position, such that the front end portion of the platform is in vertical registration with the forward-most portion of the predetermined end portion of the parking area whereat the support apparatus is located; and the lifting apparatus is also operative to lower the platform to a lowered position whereat the rear end portion thereof is vertically adjacent to a ground surface, to allow travel of a vehicle between the platform and the ground surface.

13 Claims, 10 Drawing Sheets

CAR PARKING SYSTEM

This application is a continuation-in-part of U.S. patent application Ser. No. 07/672,036 filed Mar. 19, 1991, now abandoned.

FIELD OF THE INVENTION

The present invention relates to a system and device for parking motor vehicles in parking lots and permits doubling the effective parking area of each parking space.

BACKGROUND OF THE INVENTION

A number of devices are known which permit doubling of the effective parking area of a parking lot. These devices are based on the LIFT principle of garages and are coupled to a three-phase electrical system. The basic structure of these devices is a lifting platform which supports the lifted vehicle and two pillars which are disposed next to the vehicle in the middle or two thirds of the way along the platform. This sort of structure requires a parking space which is the width of the widest vehicle plus the width of the door in order to permit the driver and passengers to get out after parking the vehicle. The existence of pillars on both sides of the vehicle requires aligning the vehicle in an accurate manner in the parking space, which reduces the ease of use of these devices. When a number of devices are mounted in a parking lot, the lot looks like an industrial zone full of pillars and spoils the aesthetic appearance of the parking area.

SUMMARY OF THE INVENTION

The present invention overcomes the deficiencies of the prior art.

It is an object of this invention to provide a system and device for doubling the effective parking area of existing parking lots, especially in big cities, by means of a convenient, aesthetic, safe and reliable system. The system and device permit easy accessibility and entry into the parking area without being restricted by the width of the parking space or the direction in which the vehicle enters the area. (In some existing systems, it is necessary to enter the parking space by driving in reverse.)

There is thus provided in accordance with the present invention a parking system for permitting parking of two vehicles in a single space comprising:

a unitary lifting platform for lifting a vehicle standing thereon to a sufficient height so that another vehicle can maneuver freely on the ground level underneath it and park in said single space;

support means for said platform comprising a substantially vertical post fixed to the ground and a movable arm attached to said post, said movable arm connecting the front end of said platform with said fixed post, so that the highest point of the platform when in a lowered position is at a height of about 60 cm or less from the ground, thereby minimizing the incline of the platform; and control means disposed under the front end of and coupled to said platform adjacent said support means for first lifting the front end of the platform together with the movable arm to a maximum position directly above said fixed post and then further lifting the platform so that the rear end thereof is raised above the height of the front end, leaving the sides and rear of the space underneath the platform substantially free for a vehicle to easily maneuver into and out of the space underneath the platform.

According to a preferred embodiment, the device further includes a lower platform for receiving a second vehicle, the lower platform preferably being movable from one space to an adjacent space.

BRIEF DESCRIPTION OF THE DRAWINGS

The present invention will be further understood and appreciated from the following detailed description taken in conjunction with the drawings in which:

FIGS. 2b-2c, 2d-2e, 2f-2g and 2h-2i are schematic side views of different wheel support means for use with a platform of FIG. 2a;

FIG. 11b is a cross-sectional view of the safety system of FIG. 11a; and

FIGS. 11c to 11f illustrate the operation of the safety system of FIG. 11a.

DETAILED DESCRIPTION OF THE INVENTION

The present invention relates to a parking device and system which permits the parking of one vehicle above another and requires that the bottom car be removed from the parking zone before lowering the upper car. One embodiment of this invention is suitable for private users, where two cars can be parked in a single parking space. In its simplest form, the device of this invention includes only a lifting platform, a support and lifting control system.

In another embodiment, the system is suitable for a parking lot including a number of parking spaces. This embodiment permits the lowering of the upper car and removal thereof from the parking lot without requiring entering and driving of the lower car.

Figure 1A:
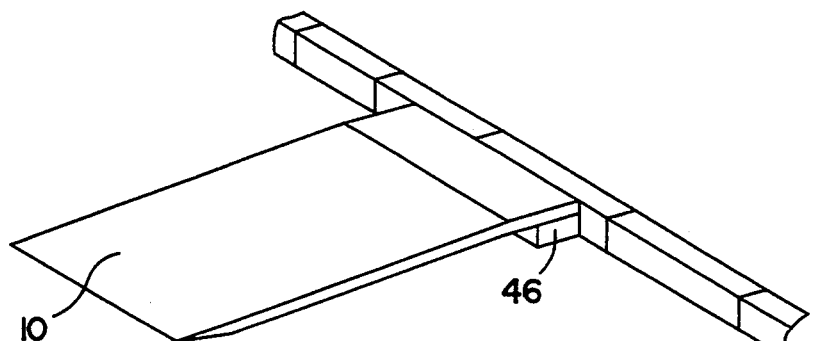
FIG. 1a is a perspective view of the parking device according to one embodiment of this invention.
Figure 1B:
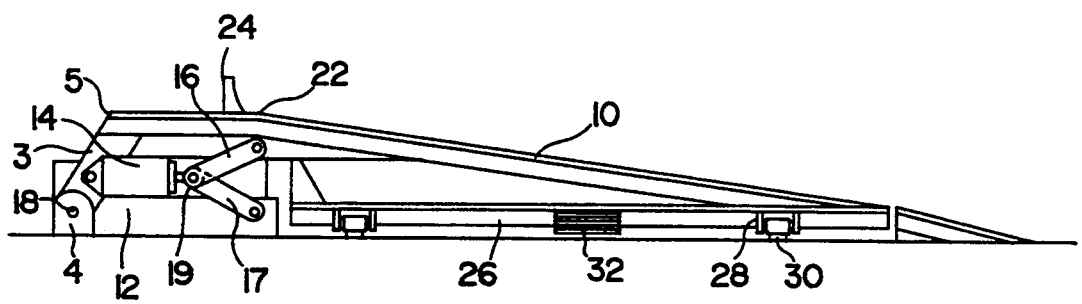
FIG. 1b is a schematic side view of an embodiment of a vehicle parking device of the present invention in the lowered orientation.
Figure 1C:
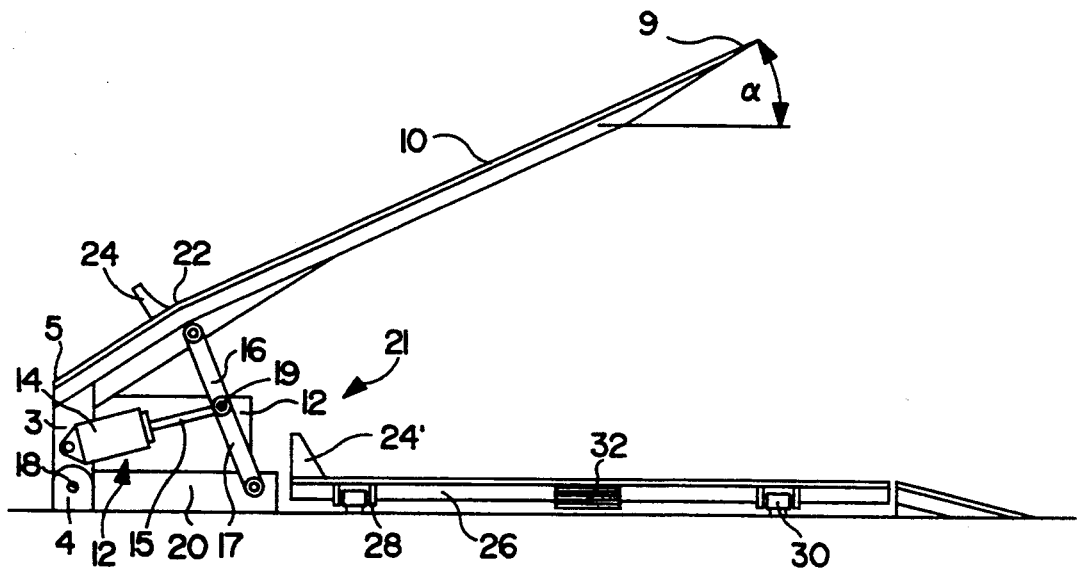
FIG. 1c is a schematic side view of a vehicle parking device of FIG. 1b in the raised orientation.

Referring now to FIGS. 1a, 1b and 1c, there is shown a parking device constructed and operative in accordance with the present invention in schematic side view in respective lowered and raised orientations and in perspective view. As can be seen from FIG. 3, the parking device of the present invention provides a compact, aesthetic platform 10 that is not very steep, without side posts to interfere with maneuvering a vehicle onto the platform or underneath it when it is raised.

The parking device as shown in FIGS. 1b and 1c includes an upper lifting platform 10 adapted for lifting a parked car from a lowered orientation (FIG. 1b) when there is no car underneath, to a raised orientation (FIG. 1c) when there is a second car to be parked in the space 21 underneath.

Lifting platform 10 is connected to a movable arm 3 which is connected pivotally 18 to a fixed post 4. Lifting of platform 10 is actuated by a control system 12 which may include, for example, a hydraulic piston 14 attached to moving arm 3 or fixed post 4 and piston rod 15 connected to rods 16 and 17. These rods 16, 17, which pivot about axis 19, are also pivotally connected to the platform 10 and to ground reinforcing bar 20 respectively and are adapted to raise platform 10 by pivoting arm 3 about axis 18. Rod 16 is attached to the platform about 1 meter from the front end thereof as close to the center of gravity of the vehicle on the platform as possible. The ground reinforcing bar 20 is provided ground to strengthen and support the post 4 and the rods 16 and 17 of the control means. When platform 10 is in the raised orientation (FIG. 1c), it can be seen that piston rod 15 is fully extended and rods 16 and 17 are locked in the support orientation under the lifted platform 10. In this position, the movable support arm 3 extends vertically above the fixed post 4, lifting the front end 5 of platform 10 to its maximum height. Thus by having the lifting mechanism connected directly to the platform it is feasible to lift the front portion of the platform directly above the fixed post.

The control system 12 preferably contains all the components used for operating the parking device. In the drawings, a hydraulic lifting system is shown, which would include a power system, pump, oil reservoir and lifting piston. Alternately, the device can also be operated by other lifting means such as a simple mechanical system of poles and screw actuated by a motor.

If the system is mechanical, the control system would include a motor (AC or DC) to operate the lifting system. The lifting arms might then have a nut to raise and lower the platform and a screw to connect the motor to the lifting arms.

According to one embodiment, the system operates with grid voltage. Alternatively, the system can function on an internal power source in one of two ways:

In one method of operation, the control system contains a 12 volt battery which operates a DC motor. The battery is charged by the parking lot owner. In a second method of operation, the system works directly from the battery of the vehicle to be parked under the platform.

According to one embodiment, the control box is partly or completely below ground level, so that there will be little or no gradient when driving on to the lifting platform.

The lifting platform 10 may also define a bend 22 therealong, disposed between the front and back wheels of the vehicle thereon. Bend 22, which preferably defines an angle of between about 145 and 175 degrees, will be described in greater detail hereinbelow.

The lifting platform may also define an upstanding front stop member 24 to prevent the vehicle parked thereon from rolling off in the forward direction.

According to a preferred embodiment of the invention, wheel retention means are provided by a cut out window in the platform to prevent motion of a vehicle on the raised platform or when being raised and lowered as is shown in FIGS. 2a to 2i. These embodiments allow the vehicle to drive onto a straight platform without depressions or holes. Only after the vehicle is at rest and the driver leaves the vehicle are the wheels lowered into the retention aperture.

Figure 2A:
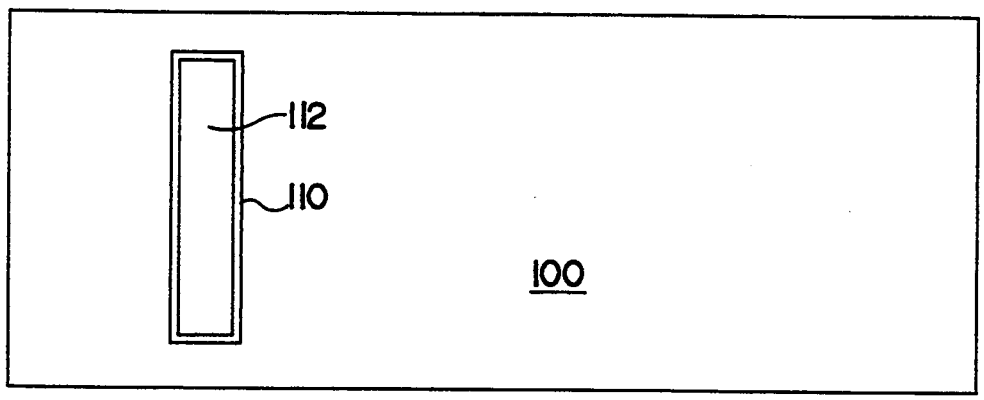
FIG. 2a is a plan view of a lifting platform with wheel retention means according to one embodiment of the invention.

FIG. 2a illustrates a plan view of a platform 100 of the present invention including a wheel retaining elongated aperture 110. When a vehicle is on platform 100 while in the elevated position, the front tires 111 are held in aperture 110, thereby preventing forward and backward movement of the vehicle on the platform. However, since it is an unpleasant sensation to drive one's vehicle into a hole, aperture 110 is closed when in the lowered orientation by means of a plate 112. When platform 100 begins to be raised to is elevated orientation, plate 112 is lowered automatically, permitting the tires 111 of the vehicle to sink into the aperture 110 and prevents forward and backward movement of the vehicle.

Figure 2B:
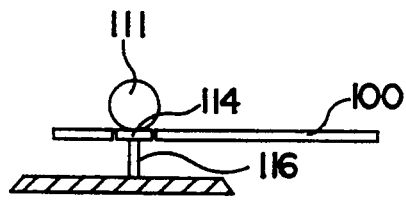
Figure 2F:
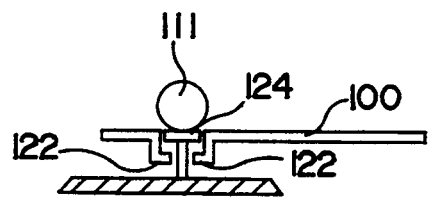
Figure 2C:
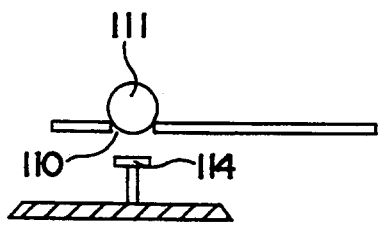

A number of possible arrangements of closure plates 112 are shown, by way of example only, in FIGS. 2b–2c through 2h–2i. In FIGS. 2b and 2c, a plate 114 is fixed via a leg 116 to the ground. As platform 100 rises, plate 114 remains fixed in place. In FIGS. 2d and 2e, a hinged plate 118 is pivotally mounted on platform 100 on one side of aperture 110. On the other side of the aperture is a ledge 120. When the platform is in the lowered orientation, a fixed post 122 underneath plate 118 supports it in the closed position (FIG. 2d) and when the platform rises above the fixed position, hinged plate 118 pivots open orientation until it rests on ledge 120.

Figure 2G:
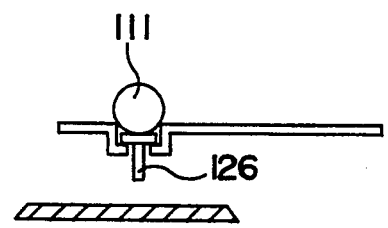
Figure 2D:
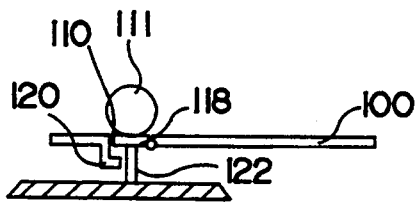
Figure 2H:
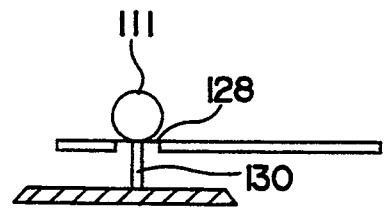
Figure 2E:
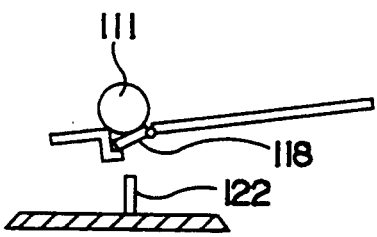
Figure 2I:
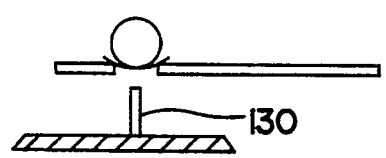

In FIGS. 2f–2g, the aperture 110 of platform 100 defines two opposite depending ledges 122. A plate 124 affixed to a post 126 is slidable disposed between the ledges 122. When the platform 100 is in the lowered orientation, post 126 rests on the ground and plate 124 is urged upwards into aperture 110. As the platform is raised to the elevated orientation, plate 124 immediately begins to slide down and rests on the ledges 122 with the tires 111 being secured in aperture 110 (FIG. 2g).

Alternatively, a deformable thin plate 128 (FIGS. 2h–2i), such as from plastic, may be utilized. Plate 128 is supported by a post 130 fixed to the ground similar to that of FIG. 2e. When the platform is in the lowered orientation, the plate 128 is flush with platform 111, and in a raised orientation, the plate 128 flexes as post 130 is removed.

According to a preferred embodiment, there is also provided a lower platform 26 on which a second car can park. Lower platform 26 (FIGS. 1 and 4) is most preferably provided with means for lateral and/or rearward movement. Because the support and control system are located exclusively under the front of the platform, the lower platform 26 can be located almost completely below the upper platform, thus gaining parking area. It will be appreciated that in a large parking lot, each lower car will sit on its own lower platform. It is possible to leave one parking space without a lower platform in order to permit the lateral movement of the other platforms around the lot. Alternatively, each platform can be movable rearwardly and then laterally to permit removal of a lower car without displacing other cars in the lot.

Thus, when it is desired to remove an upper car underneath which another car is parked, the lower platform 26 on which the lower car is parked can be moved to an adjacent vacant space on one side or the other, thereby permitting the upper car to be lowered and removed without requiring entering and driving of the lower car. One suitable mechanism is illustrated in FIGS. 1b and 1c and includes a lower platform on wheels 28 (preferably 4 pairs of wheels) arranged to roll on tracks 30 mounted on or in the ground of the parking area. Movement of lower platform 26 is preferably activated by a motor 32 connected to the lower part of the lower platform, or by any other means.

The guiding principle of the present invention is to permit two vehicles to park on top of one another in a space substantially the size of a maximum space for a single vehicle in conventional lots and providing mobility and maneuverability for the lower vehicle.

Figure 3:
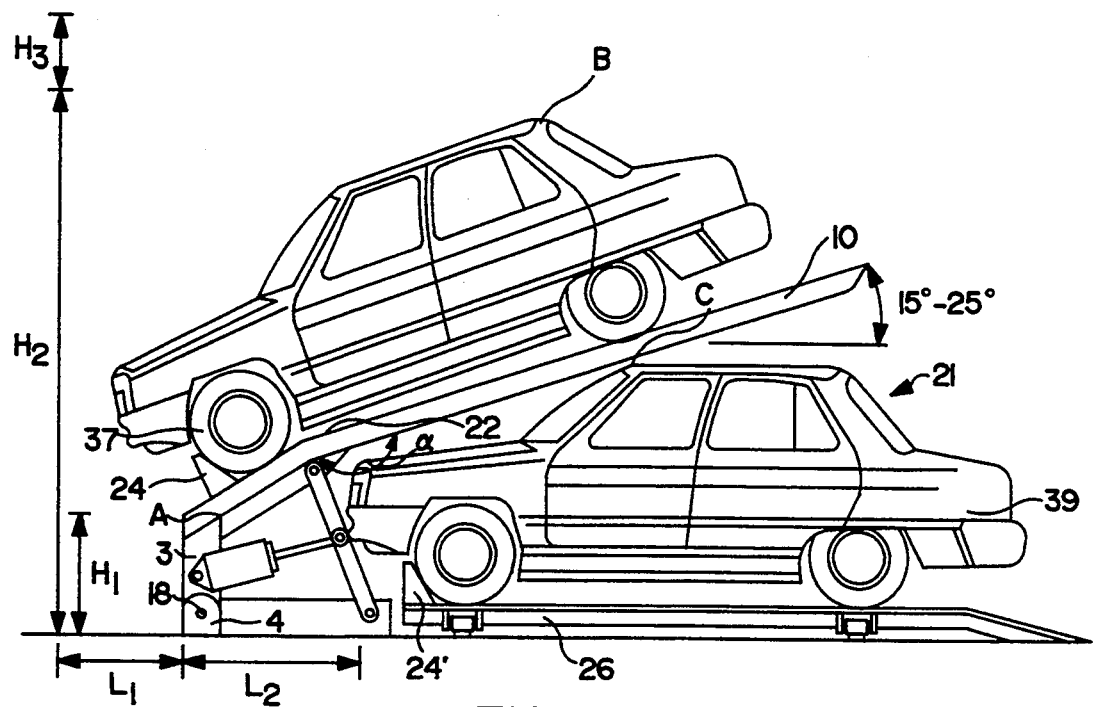
FIG. 3 is a schematic view of the parking device of FIG. 1c with two cars parked thereon.

Referring now to FIG. 3, there is shown the parking device of FIG. 1c in operation with first and second cars 38, 39 parked thereon. It will be appreciated that the front wheels 37 of the upper car 38 are supported by upstanding front stop member 24 on the upper platform. The angle of inclination of the upper platform is illustrated as the preferred angle of about 15 to 25 degrees with respect to the horizontal. It will be noted that this permits a second car 39 to drive onto the lower platform until it reaches upstanding stop member 24' of the lower platform. It can be seen that the distance required from the end of the space such as the wall of the garage to the frontmost part of the lower car would be $L_1$ (wall to post)+$L_2$ (post to car). This distance should be as short as possible as $L_1$ is preferably zero, but is generally longer than that available in a conventional parking space. Accordingly, it is a particular feature of the present invention to reduce the distance $L_2$. This is accomplished by having the lifting platform 10 connected to a movable arm 3 at a point A, so that arm 3 can pivot vertically until point A is directly above the post 4 for maximum height $H_1$ when the platform is raised. Thus the support means is preferably comprised of two sections, a fixed post 4 and a movable arm 3, which can extend the height of A from a lowered position to the maximum $H_1$ in a raised position.

In certain parking lots, the height of the parking lot is also limited. Accordingly, it is desired to park the upper car in such a position that its highest point B will be as low as possible.

Accordingly, according to one preferred embodiment of the invention, at least one bend 22 is provided in the platform in back of where the front wheels of the upper vehicle are to rest and just above the area where the front of the hood of the lower vehicle is to park. This bend 22 serves two purposes. First, it permits lowering the front end of the upper platform to about 40 to 45 cm above the ground, thereby providing a less steep ramp than a comparable straight platform. This is particularly desirable in order to prevent discomfort among drivers presented with a steep slope. And second, it permits a most efficient use of the volume of the parking space between the lifting platform and lower vehicle in that the lifting platform approaches the highest point C of the lower car at a relatively low angle. A bend of about 145 to 175 degrees permits the lowering of the highest point of the upper car from $H_3$ to $H_2$, a significant saving in height. In addition, the specific location of the bend between the wheels and the size of the angle also affect the length of $L_2$. Thus, by moving bend 22 forwardly under the upper car, $L_2$ can be shortened accordingly, providing savings both in length and height of the required parking space.

Figure 4:
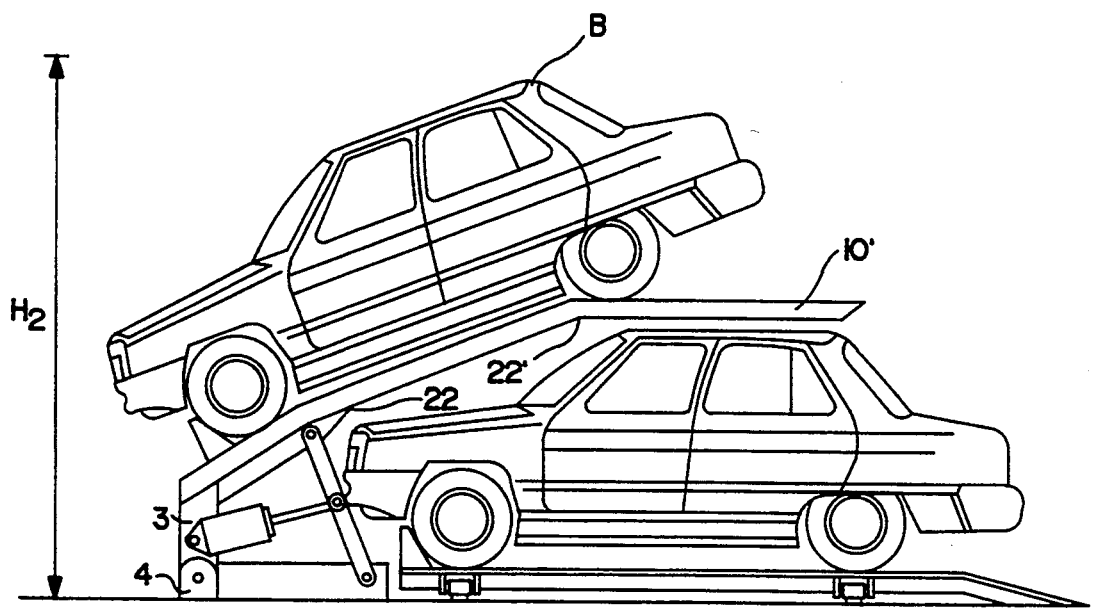
FIG. 4 is a schematic side view of a parking device according to an alternate embodiment of the invention.

In FIG. 4, another embodiment of the invention is shown wherein two bends 22 and 22' are provided in the lifting platform 10'. This permits the lifting platform to conform even more closely to the contour of the lower vehicle. In this embodiment, the height $H_2$ of the highest point of the car B is even lower than that in FIG. 2.

Figure 5A:
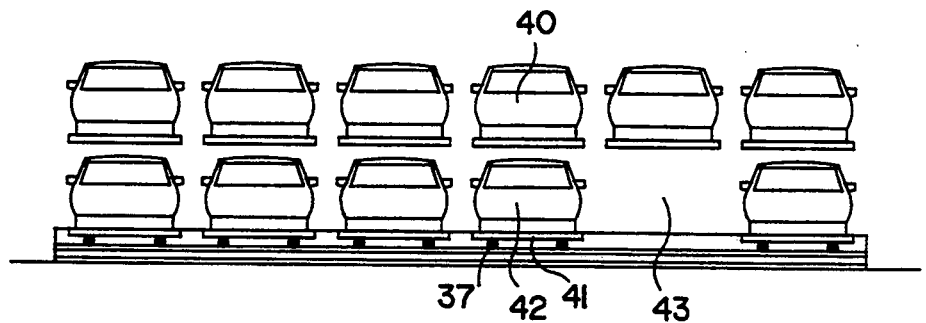
FIG. 5a is a schematic side view of a row of vehicles parked in a parking lot in accordance with this invention.
Figure 5B:
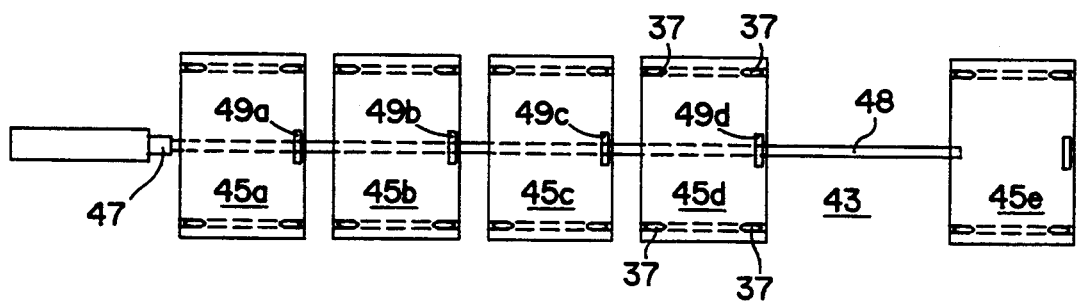
FIGS. 5b and 5c are schematic plan views of lower platforms arranged in a parking lot.
Figure 5C:
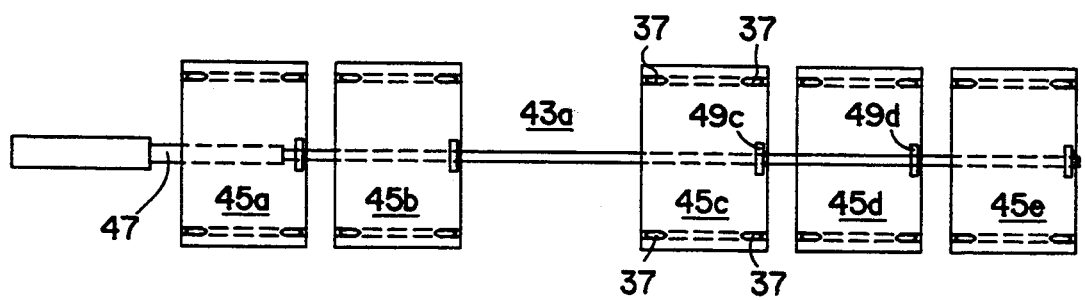

With reference to FIG. 5a, there is illustrated a system according to the present invention for use in a large parking lot which permits parking a plurality of cars one on top of the other. When it is desired to remove one car, say an upper car 40, the car 42 underneath it can be moved to an adjacent empty lower space 43 by moving the lower platform 41 on which it is parked. This obviates the need for an attendant to drive the lower car out of its space and back in again after the upper car is removed. The lower platforms can be moved, for example, as shown in FIGS. 5b and 5c. Initially, the lower platforms (FIG. 5b) are arranged so that an empty car space 43 exists between platforms 45d and 45e. Underneath and traversing all the platforms 45a to 45e is a rod 48 which can independently engage each platform with individual braking means 49a–49e. At one terminal end, rod 48 is connected to a piston 47 which can extend or retract the rod 48 by a distance of approximately one car width space 43. Thus, for example when the space occupied by platform 45c is to be vacated so that an upper parked vehicle can be lowered, rod 48 is first partially withdrawn into the piston 47 and, as in FIG. 5b, brakes 49c and 49d are applied to platforms 45c and 45d, connecting these platforms to the rod 48 while keeping the remaining platforms 45a, 45b, 45e unconnected. Piston 47 is then extended, thereby pushing rod 48 forward, as in FIG. 5c, and moving platforms 45c and 45d laterally on their wheels 37 until the space 43a becomes available.

Figure 6A:
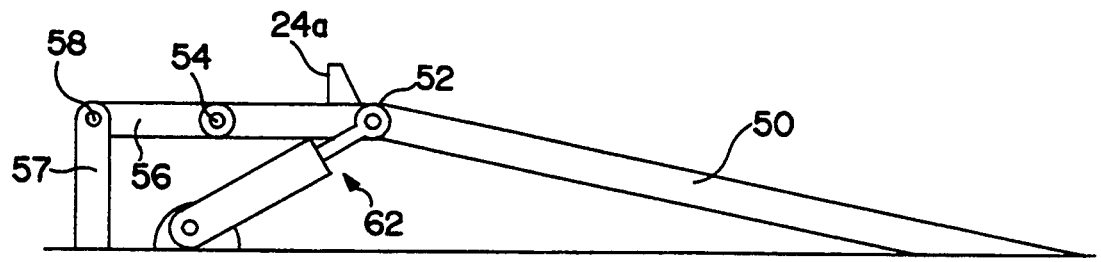
FIGS. 6a, 6b and 6c show schematic side views of a parking device according to an alternate embodiment of the present invention in respective lowered, intermediate and raised orientations.
Figure 6B:
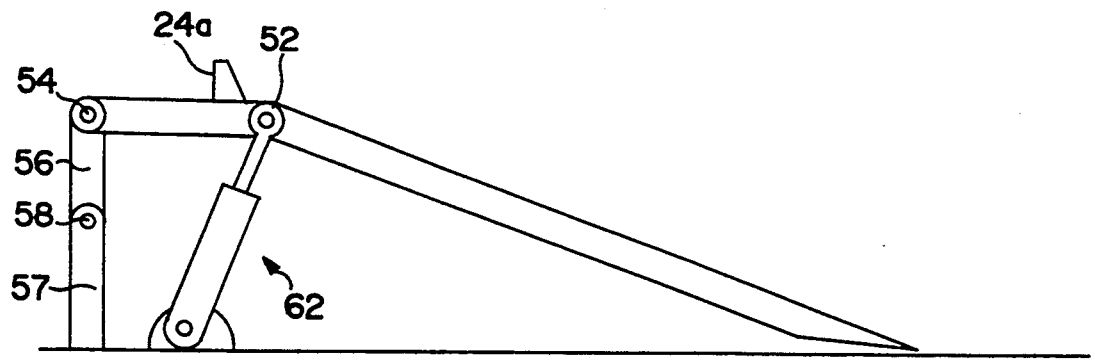
Figure 6C:
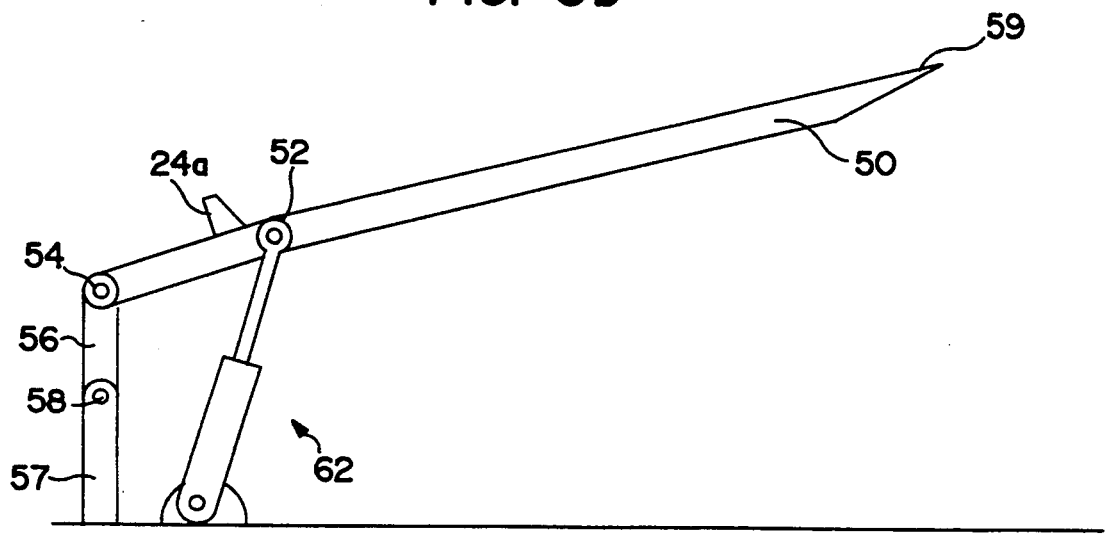

FIGS. 6a–6c illustrate an alternate embodiment of a parking device according to the present invention. This device includes a platform 50 defining an optional bend 52 as described above pivotably affixed about an axis 54 at one end of movable support arm 56 which is, in turn, pivotably connected to fixed support arm 57 about axis 58.

Figure 6D:
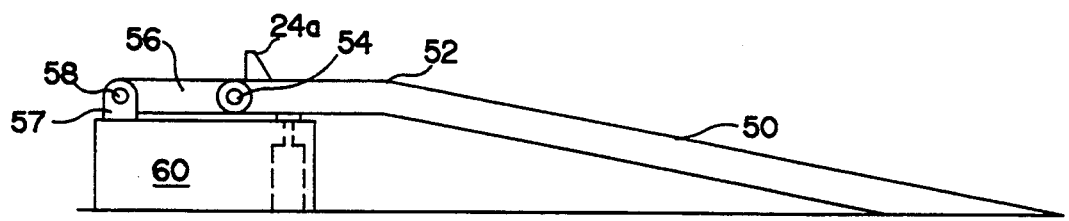
FIGS. 6d and 6e illustrate a parking device similar to that of FIGS. 6a-6c but with an alternate lifting mechanism.
Figure 6E:
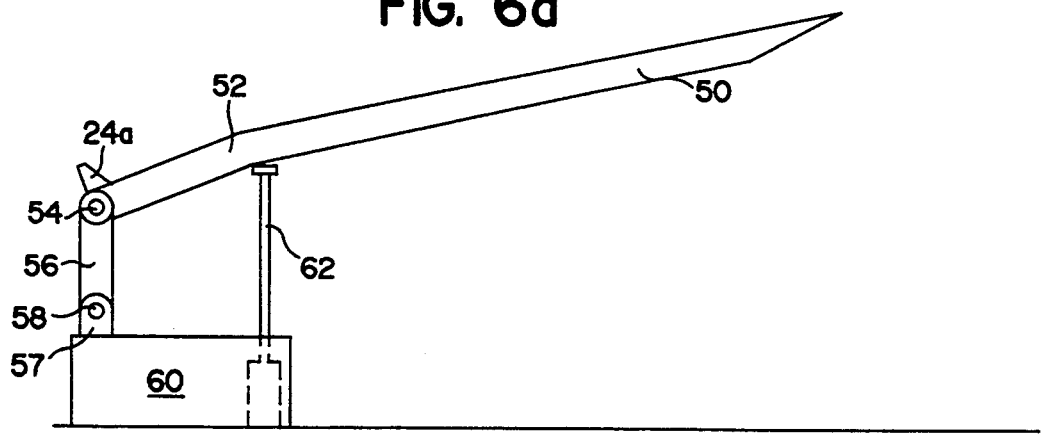

An hydraulic piston 62 serves to lift platform 50 gradually in two stages, first raising the platform 50 about axis 54, while at the same time raising arm 56 pivotally on axis 58 (FIG. 6b), and then further lifting platform 50 about axis 54, so that its end 59 is higher than its front (FIG. 6c). In the embodiment shown in FIGS. 6d and 6e, piston 62, for example, may include a ball at its end which rolls in a track in platform 50 during the raising and lowering.

Figure 7A:
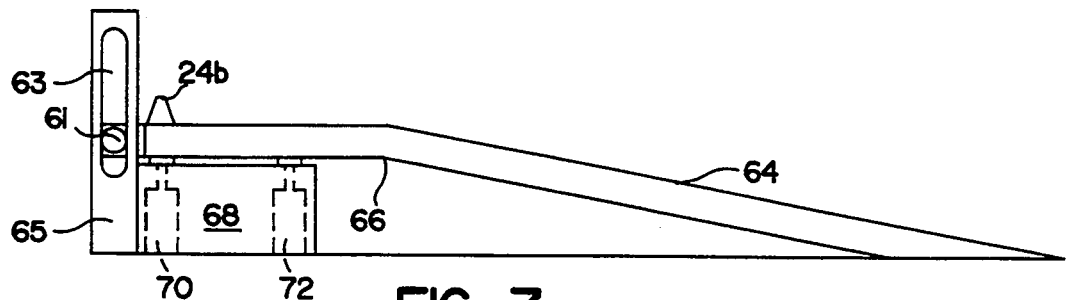
FIGS. 7a and 7b show schematic side views of a parking device according to yet another embodiment of the present invention in respective lowered and raised orientations.
Figure 7B:
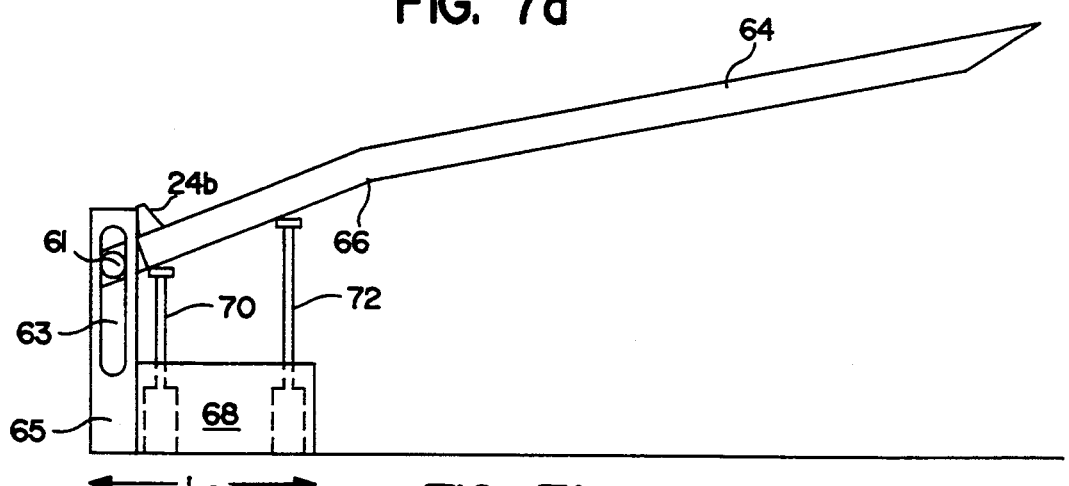

FIGS. 7a and 7b illustrate another embodiment of a parking device according to the present invention. This device includes a platform 64, optionally defining a bend 66 as described above, mounted on post 65 by means of a pin 61 engaging a slot 63. Under the platform 64 is disposed a control system 68 having two hydraulic pistons 70, 72 which serve to lift platform 64 gradually to the desired height and angle. The front of the lifting platform is first raised by piston 70 from a height of about 20 cm to the maximum support height, then piston 72 lifts the rear of the platform to the desired angle. This embodiment permits lowering the height of the control box and platform to about 20 cm, which is barely perceived as a slope by a driver. In addition, this embodiment permits the shortening of the length $L_2$ since the pistons 70, 72 can be located relatively close to one another.

Figure 8A:
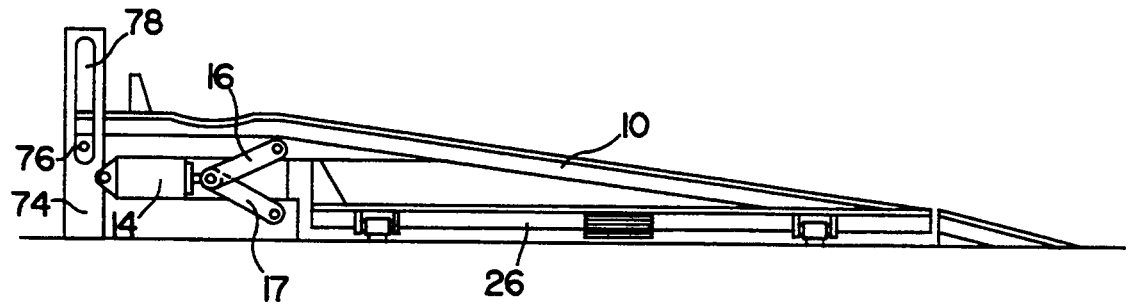
FIGS. 8a and 8b show schematic side views of a further embodiment of a parking device according to the present invention in respective lowered and raised orientations.
Figure 8B:
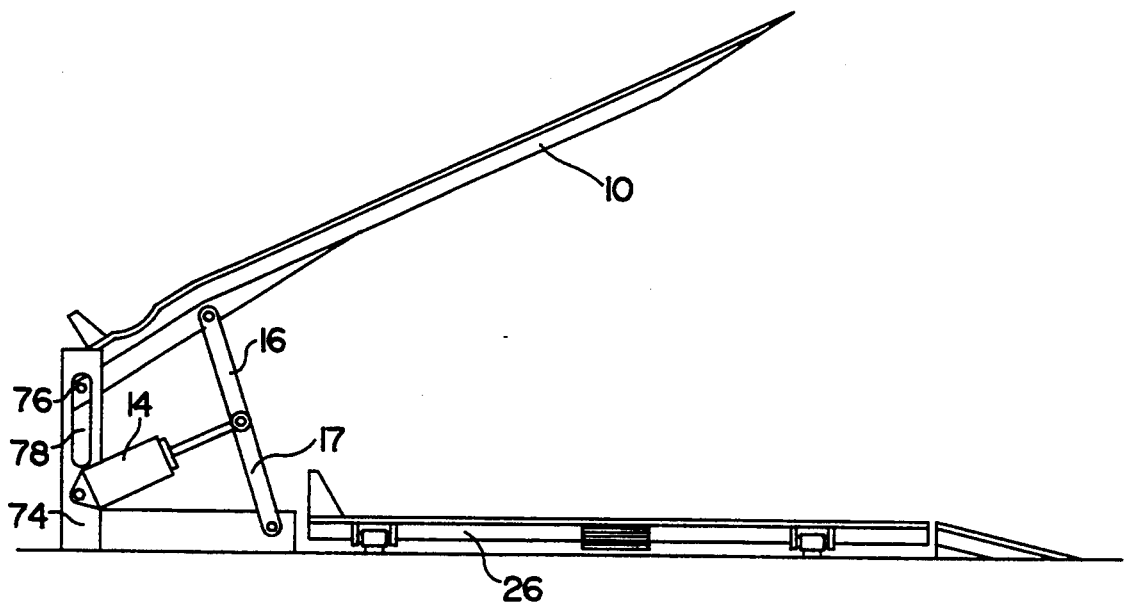

FIGS. 8a and 8b illustrate yet another embodiment of a parking device according to the present invention combining the support means illustrated in FIGS. 7a and 7b with control means illustrated in FIGS. 1b and 1c, except in this case the hydraulic piston 14 is attached to the fixed vertical post 74 with the elongated slot 78 along its length. The lifting platform 10 is coupled at its front end to post 74 by means of a movable arm comprising a pin 76 keyed in the slot 78. When the platform is lifted by the piston 14 extending rods 16 and 17, the pin 76 first travels up the slot 78 causing the front of the platform 10 to be raised to the top of slot 78. Subsequently the rear of the platform is raised higher than the front. This configuration also allows the platform 10 to be situated very close to ground level, because the slot 78 can be lowered as close as possible to ground level.

Figure 9A:
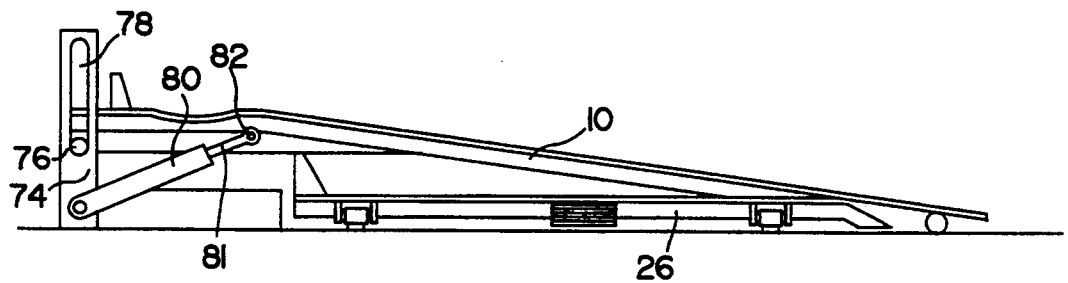
FIGS. 9a and 9b show schematic side views of still a further embodiment of a parking device according to the present invention in respective lowered and raised orientations.
Figure 9B:
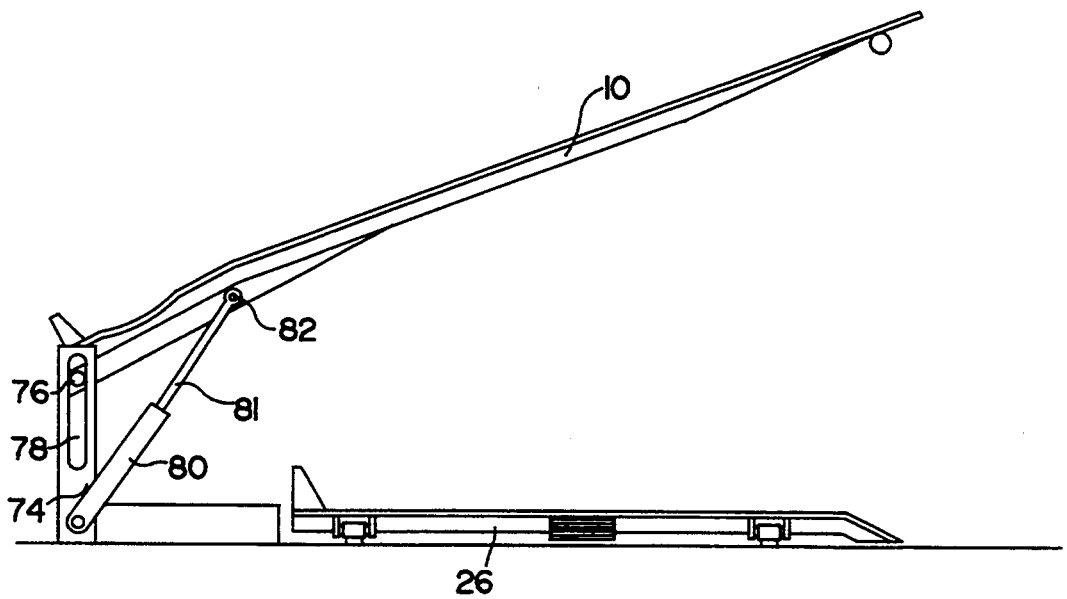

FIGS. 9a and 9b illustrate a still further embodiment of a parking device according to the present invention. This embodiment is similar to the embodiment illustrated in FIGS. 8a and 8b above, except that the piston rod 81 of hydraulic piston 80 is joined directly to platform 10 at the axis 82. Here also piston 80 serves to first lift the front of platform 10 by pushing movable arm 76 up slot 78 and subsequently raising the rear of the platform.

The structure of the device of the present invention is different in a number of basic ways from those devices which exists on the market:

a. The platform which lifts the car is supported on the ground proximate one end therEof. The platform pivots about this support, thereby raising the other end. This method ensures the safety and high reliability of the device relative to other devices on the market.

b. The device is built without lateral pillars or parts which protrude beyond the parking space. This method ensures a highly aesthetic appearance of the parking area.

c. Since the device has a lifting mechanism up front and no side pillars, it provides a large free area with flexibility and ease of entering and leaving a parking space and maximum convenience for parking a vehicle. It also permits operation of a laterally moving platform for the purpose of moving the lower car to the left or right. This is done in order to lower the upper car in the device without touching the lower car.

d. Furthermore, since the lifting mechanism is connected to the platform about 1 meter from the front thereof, it makes feasible the lifting of the front of the platform up t and above the fixed post.

e. The device can be operated by means of a DC motor operated by the vehicle battery or by a battery located in the device itself. This method permits installation of the device without expensive electrical installation. Rather, there is low installation cost for do-it-yourself operation.

The method of operating the device is as follows, with further reference to FIG. 3.

A first car 38 arrives at the parking area and drives up onto the upper platform 10 of the device. The ascent to platform 10 can be accomplished by driving forwards or backwards. When a second car 39 arrives at the parking lot, the driver of the second car, or the parking attendant, activates the piston 14 by coupling the second car to a power cable (or the battery or central power system existing in the control box). The upper platform 10 is lifted up by the control system and permits the second car to drive onto lower platform 26 in the space 21 beneath. Second car 39 enters until its forward wheel is stopped by upstanding edge 24' of lower platform 26.

When it is necessary to remove a car from the upper platform of a parking space, it is possible to move the lower car to the right or left into an empty space, and lower the upper car which one wants to remove. The activation system for movement to the right and left can be worked from a motor which is located in the base of the lower platform or from a drive system located in the control box.

The lifting platform is shaped in such a way that the upper vehicle is raised primarily at its rear end, which provides stability and safety of the device and, on the other hand, does not give the feeling of a car hanging completely in the air, which could generate apprehension that the car might fall.

Figure 10:
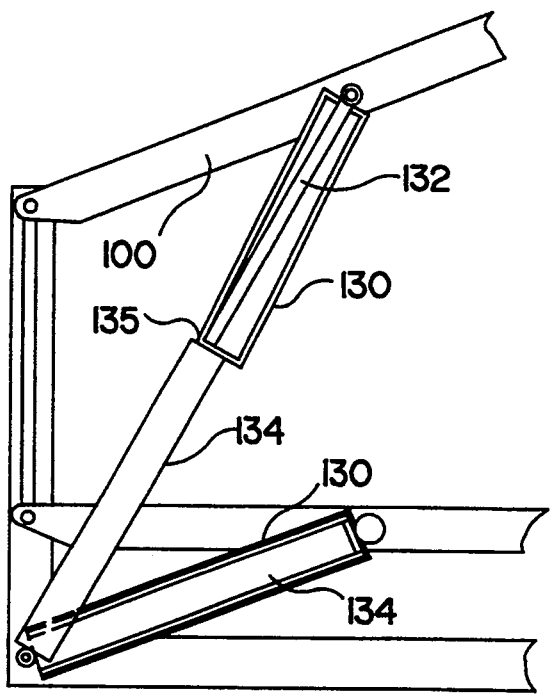
FIG. 10 is a side view of a safety system for preventing a lifting platform from falling down according to one embodiment of the invention.

Additionally according to a preferred embodiment of the invention, the device includes a safety system to prevent uncontrolled lowering of the raised platform with a vehicle thereon. One example of such a system is shown in FIG. 10. In this embodiment, a sleeve 130 is provided coupled to the outermost end of piston rod 132. In the closed or lowered orientation (shown in broken lines), the piston rod 132 is fully retracted and sleeve 130 seats around piston cylinder 134. In the extended or open orientation, the sleeve 130 can be wedged between the end of the piston rod and piston shoulder 135. The wedged cylinder can be released by extending the piston rod 132 somewhat and manually moving the sleeve 130, then retracting the piston rod 132 with the sleeve 130 sliding over piston cylinder 134.

Figure 11A:
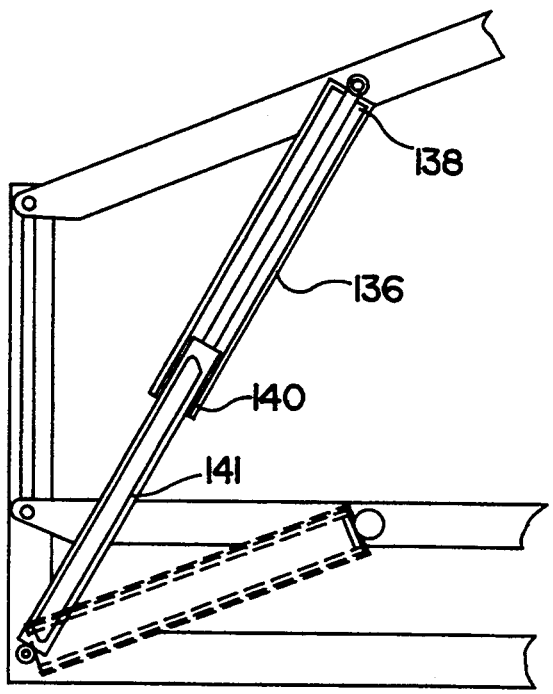
FIG. 11a is a side view of an alternate embodiment of a safety system according to the invention.

An alternate embodiment is shown in FIGS. 11a, 11b and 11c–11g. FIG. 11a shows a lifting piston which includes sleeve means 136 attached at its upper end to the end of the piston rod 138. Selective locking means are provided between the cylinder 140 and the sleeve 136 permitting locking of the sleeve 136 when the piston rod 138 is in the extended orientation and release thereof to permit retraction of the piston rod 138 as shown in broken lines for lowering a platform.

Figure 11B:
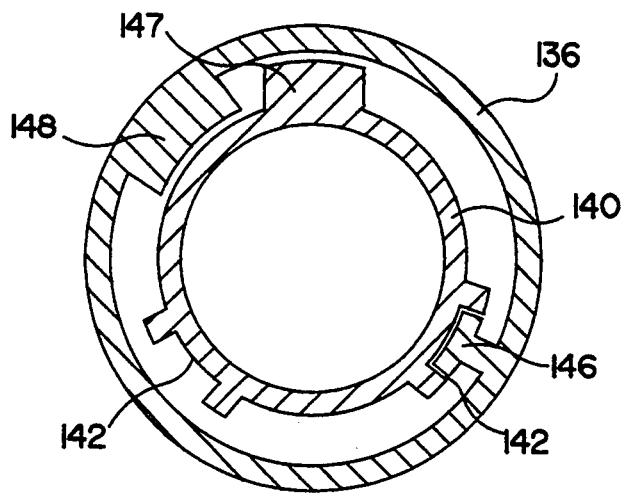

One type of suitable locking arrangement is shown in blown-up cross-sectional view in FIG. 11b and in FIGS. 11c–11g. The piston cylinder 140 is provided with longitudinal track means 142 along two sides of the outer surface thereof, preferably displaced about 90° from one another, and connecting in a spiral around the circumference at the ends thereof. The uppermost portion of track means 142 defines a groove 152. At its outermost end, cylinder 140 is also provided at its top with a stop member 147.

The sleeve 136 defines on its inner surface pin means 146 which are arranged to slide in track means 142 on the cylinder. Sleeve 136 also defines at the lower end thereof a stop member 148. During entension of the piston rod 138, sleeve 136 slides along cylinder 140 in the orientation shown in cross-section in FIG. 11*b*. When the piston rod is almost fully extended, sleeve 136 rotates as pin means 146 follow the upward curving track and rest in groove 152. Stop member 148 at the bottom of sleeve 136 is now aligned on top of stop member 144 of the piston cylinder 140 and rests thereon, thereby preventing retraction of the cylinder rod. This safety device operates only when the hydraulic system fails.

Figures 11C, 11D, 11E, 11F, 11G:
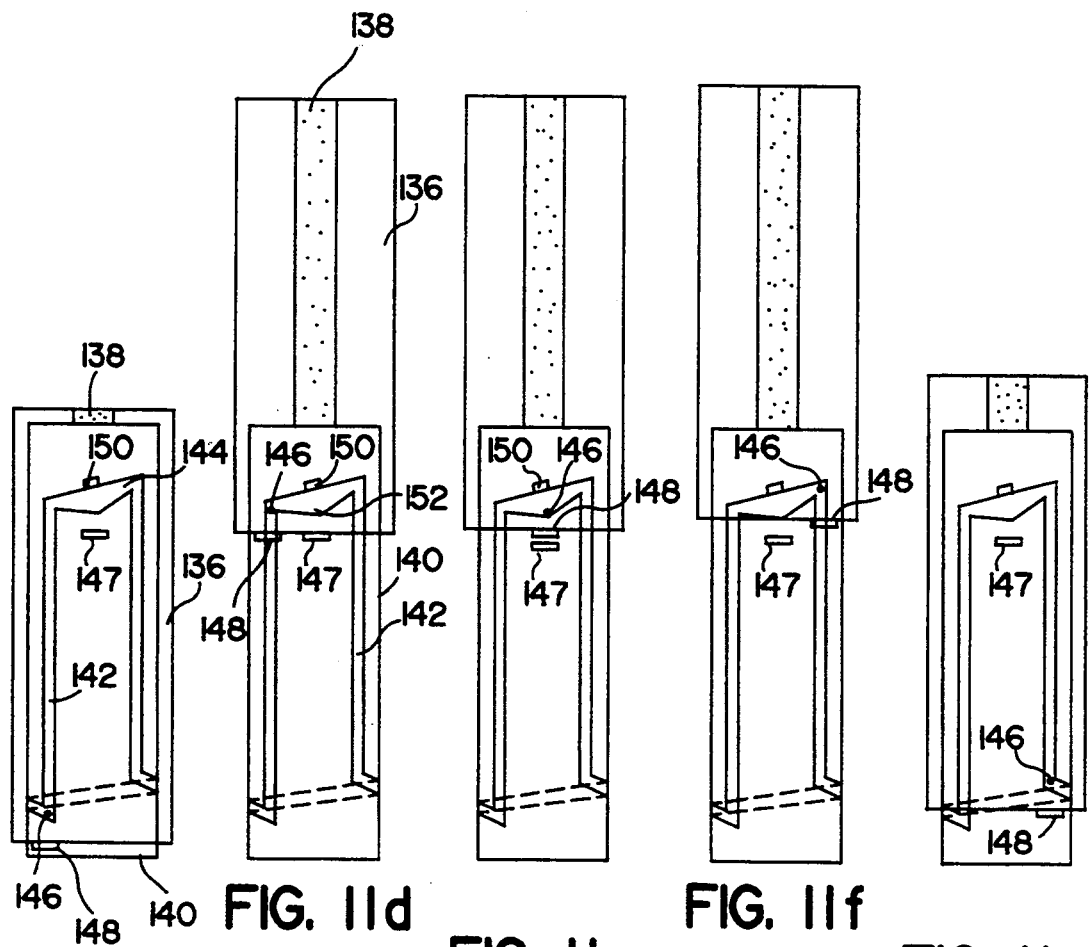

FIGS. 11*c* to 11*g* schematically illustrate operation of the locking means. FIG. 11*c* shows the retracted orientation wherein cylinder 140 seats within sleeve 136 with pin means 146 keyed in track means 142. As the piston rod extends 138, pin means 146 travels longitudinally in track means 142 from the bottom of the cylinder 140 towards the top thereof. Near the top, track means 142 defines an upward spiral (indicated at 144). As pin means 146 continues to move through track means 142, sleeve 136 rotates along the spiral track 144 about cylinder 140. Magnetic or other indicator means 150 are provided to indicate when the stop members 148 and 147 are aligned slightly spaced on top of one another for engagement and the piston rod 138 can retract slightly to the locking orientation indicated in FIG. 11*e*.

When the platform is to be lowered, piston rod 138 is extended slightly further than the position seen in FIG. 11*e*, and sleeve 136 is rotated further (see FIG. 11*f*) so as to cause pin means 146 to turn in spiral fashion so as to leave groove 152. Accordingly, as the piston rod 138 retracts, sleeve 136 slides back down track means 142 on the other side of cylinder 140 (FIG. 11*g*). When the piston 138 is almost completely retracted, track means 142 spirals again about cylinder 140 returning to the lowered orientation of FIG. 11*c*.

It will be appreciated by those skilled in the art that the invention is not limited to what has been shown and described hereinabove by way of example. Rather, the scope of the invention is defined solely by the claims which follow.

I claim:

1. A parking system for vehicles which includes vehicle parking apparatus comprising:
    a vehicle support platform for supporting a vehicle over a parking area and including:
    a rear end portion adapted to permit travel of a vehicle thereacross;
    a front end portion; and
    side portions extending longitudinally between said rear and front end portions; and
    support means for said platform located at a predetermined end portion of the parking area and adapted to engage said platform front end portion only;
    said support means also including lifting means which is operative to cause an initial pivoting of said platform about said rear end portion thereof such that said front end portion of said platform becomes elevated above said rear end portion, said lifting means being also operative to cause an additional pivoting of said platform about said front end portion thereof such that said rear end portion of said platform becomes elevated relative to said front end portion thereof, thereby bringing said platform into a raised position so as to provide vertical clearance between said platform and the parking area that is sufficient to enable entry of a vehicle into the parking area beneath said platform;
    wherein, when said platform is in said raised position, said support means is further adapted to support said platform over the parking area such that said front end portion of said platform is in vertical registration with a forward-most portion of the predetermined end portion of the parking area whereat said support means is located; and
    wherein said lifting means is also operative to lower said platform to a lowered position whereat said rear end portion thereof is vertically adjacent to a ground surface, thereby allowing travel of a vehicle between said platform and the ground surface.

2. A parking system according to claim 1, and wherein said platform is configured to support a vehicle such that an end portion of the vehicle extends over said front end portion of said platform.

3. A parking system according to claim 1, and wherein, in said raised position, said rear end portion is elevated above said front end portion by a predetermined slope angle.

4. A parking system according to claim 1, and wherein said vehicle support platform is an upper vehicle support platform and wherein said vehicle parking apparatus also includes:
    a lower vehicle support platform which is adapted for selectable location on the parking area and which is located, in a first operative position, immediately beneath said upper vehicle support platform; and
    means for transversely moving said lower platform between the first operative position and a second operative position whereat said lower platform is not located immediately beneath said upper platform;
    and wherein, when said upper platform is in the raised position and said lower platform has a vehicle located thereon and is located immediately beneath said upper platform so as to obstruct lowering of said upper platform, movement of said lower platform to the second operative position is operative to permit lowering of said upper platform from the elevated position to the non-elevated position.

5. A system according to claim 4, and wherein said vehicle parking apparatus is a first vehicle parking means and said system also includes at least one second vehicle parking means similar to said first vehicle parking means, arranged in a side-by-side arrangement therewith.

6. A parking system according to claim 1, and wherein said lifting means comprises force actuator means having one end portion associated with a rigid mounting and also having another end portion associated with said platform, wherein an initial extension of said force actuator means is operative to cause said initial pivoting of said platform about said rear end portion thereof, and wherein an additional extension of said force actuator means is operative to cause said additional pivoting of said platform about said front end portion thereof.

7. A system according to claim 1, and wherein said support means has formed therein generally vertical slot means and said front end portion of said platform has mounted thereon generally transverse protrusions arranged in said slot means for generally linear vertical and rotational movement therein.

8. A parking system according to claim 1, and wherein said support means comprises a fixed post member and a movable member pivotally connected at a first end to said front end portion of said platform and pivotally connected at a second end to said post member, so that when said platform is lifted to the raised position, said movable member is pivoted to a generally vertical position above said fixed post member.

9. A parking system according to claim 1, and wherein said vehicle parking apparatus also includes wheel engagement means associated with said front end portion of said platform for engaging wheels of a vehicle located on said platform.

10. A parking system according to claim 9, and wherein said wheel engagement means comprises means for engaging wheels of a vehicle located on said platform in response to an elevation thereof.

11. A parking system according to claim 10, and wherein said wheel engagement means comprises at least one opening in said platform, and means for selectably uncovering said at least one opening in response to an initial elevation of said platform, and for covering said at least one opening in response to a substantial lowering of said platform.

12. A system according to claim 9, and wherein said wheel engagement means comprises at least one opening in said platform; and a flexible member arranged across said at least one opening and adapted to flex in response to a generally downward force applied thereto by a vehicle wheel so as to define a recess, thereby to cause engagement of the wheel in said at least one opening.

13. A system according to claim 1, and wherein said vehicle parking apparatus also includes means for selectably locking said support means when said platform is in a raised position.

* * * * *